US010811739B2

(12) United States Patent
Yamashita et al.

(10) Patent No.: US 10,811,739 B2
(45) Date of Patent: Oct. 20, 2020

(54) BATTERY PACK

(71) Applicant: DENSO CORPORATION, Kariya, Aichi-pref. (JP)

(72) Inventors: Kouji Yamashita, Kariya (JP); Yoshimitsu Inoue, Kariya (JP); Hiroyoshi Yamamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 24 days.

(21) Appl. No.: 15/750,859

(22) PCT Filed: Aug. 2, 2016

(86) PCT No.: PCT/JP2016/072645
§ 371 (c)(1),
(2) Date: Feb. 7, 2018

(87) PCT Pub. No.: WO2017/026326
PCT Pub. Date: Feb. 16, 2017

(65) Prior Publication Data
US 2018/0241104 A1 Aug. 23, 2018

(30) Foreign Application Priority Data

Aug. 7, 2015 (JP) .................................. 2015-157254

(51) Int. Cl.
*H01M 10/617* (2014.01)
*H01M 10/6551* (2014.01)
*H01M 10/6556* (2014.01)
*H01M 10/6563* (2014.01)
(Continued)

(52) U.S. Cl.
CPC ....... *H01M 10/617* (2015.04); *H01M 2/1077* (2013.01); *H01M 2/1083* (2013.01);
(Continued)

(58) Field of Classification Search
CPC .................................................... H01M 10/60
See application file for complete search history.

(56) References Cited

U.S. PATENT DOCUMENTS 6,326,103 B1 12/2001 Ido et al.
2010/0275619 A1* 11/2010 Koetting ............. H01M 10/613
62/79
(Continued)

FOREIGN PATENT DOCUMENTS

CN 104118305 A 10/2014
JP 2009-170370 A 7/2009
(Continued)

OTHER PUBLICATIONS

Sep. 20, 2016 International Search Report issued in International Patent Application No. PCT/JP2016/072645.
(Continued)

*Primary Examiner* — James Lee
(74) *Attorney, Agent, or Firm* — Oliff PLC

(57) ABSTRACT

A battery pack includes a plurality of batteries, a housing, a circulation path, and a blower. The circulation path includes a bottom wall side path formed between lower faces of the batteries and a bottom wall which is the bottom side of the housing. The bottom wall is provided with a plurality of beams arranged in parallel for reinforcing the housing, and the batteries are arranged on the beams. The bottom wall side path is formed as a space surrounded by the lower faces of the batteries, the bottom wall, and the beam. The width of the bottom wall side path formed between adjacent beams is set to be larger than the width of one beam.

15 Claims, 5 Drawing Sheets

(51) Int. Cl.
  *H01M 10/625* (2014.01)
  *H01M 10/663* (2014.01)
  *H01M 10/615* (2014.01)
  *H01M 2/10* (2006.01)
  *H01M 10/613* (2014.01)

(52) U.S. Cl.
  CPC ....... *H01M 10/615* (2015.04); *H01M 10/625* (2015.04); *H01M 10/6551* (2015.04); *H01M 10/6556* (2015.04); *H01M 10/6563* (2015.04); *H01M 10/663* (2015.04); *H01M 10/613* (2015.04)

(56) References Cited

U.S. PATENT DOCUMENTS

| | | |
|---|---|---|
| 2014/0356660 A1 | 12/2014 | Inoue |
| 2015/0037631 A1 | 2/2015 | Lee et al. |
| 2015/0037633 A1 | 2/2015 | Akiyama et al. |

FOREIGN PATENT DOCUMENTS

| | | |
|---|---|---|
| JP | 2009-211829 A | 9/2009 |
| JP | 2010-015955 A | 1/2010 |
| JP | 2010-123298 A | 6/2010 |
| JP | 2013-164931 A | 8/2013 |
| JP | 2015-046321 A | 3/2015 |

OTHER PUBLICATIONS

U.S. Appl. No. 15/750,868, filed Feb. 7, 2018 in the name of Hiroyoshi Yamamoto et al.

\* cited by examiner

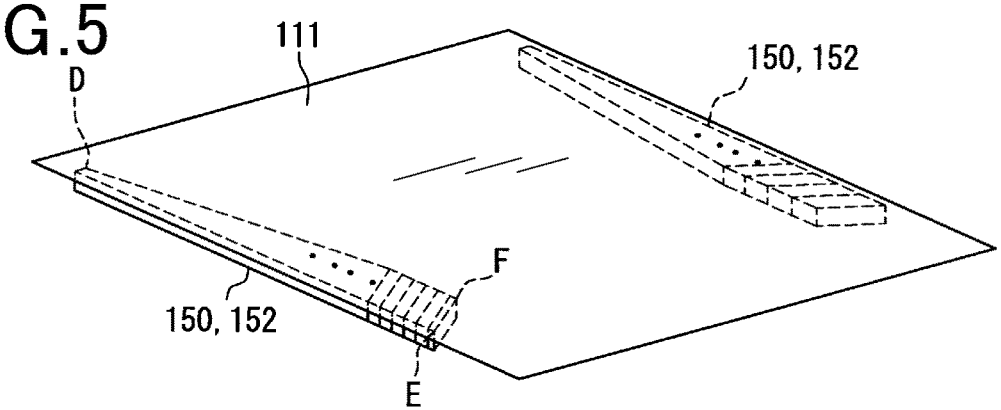
FIG.5
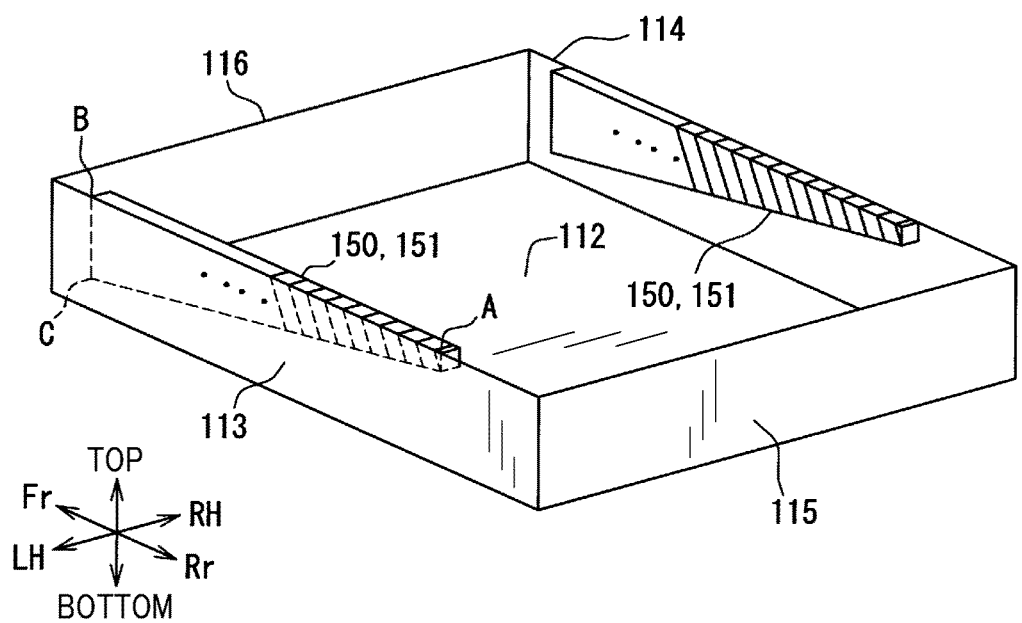
FIG.6
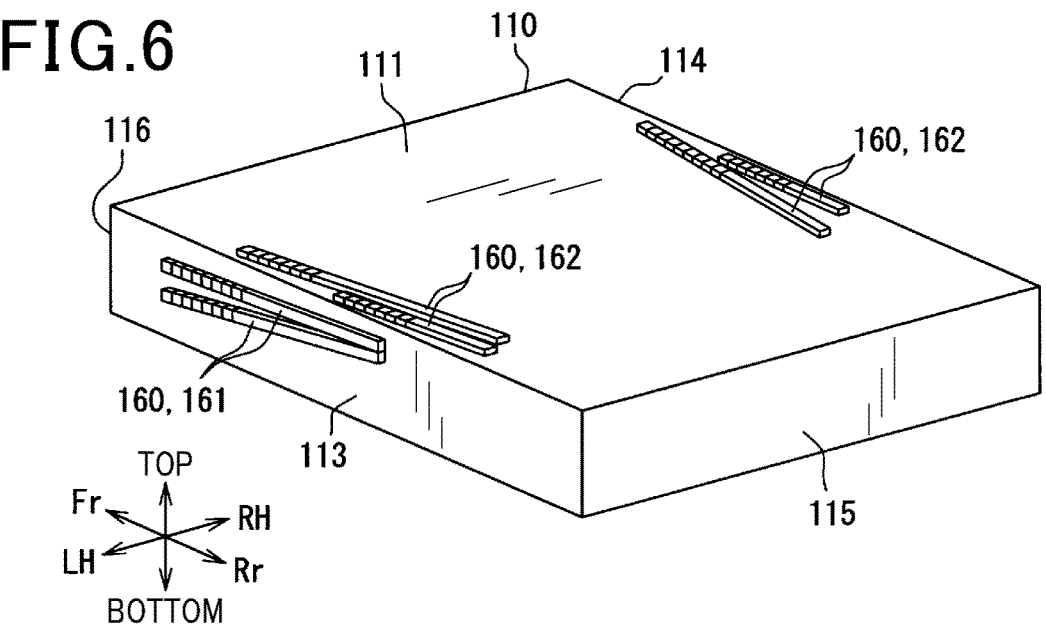

BATTERY PACK

CROSS-REFERENCE TO RELATED APPLICATION

This application is the U.S. national phase of International Application No. PCT/JP2016/072645 filed Aug. 2, 2016 which designated the U.S. and claims priority to Japanese Patent Application No. 2015-157254 filed Aug. 7, 2015, the entire contents of each of which are hereby incorporated by reference.

TECHNICAL FIELD

The present invention relates to a battery pack having a plurality of battery cells accommodated in a case.

BACKGROUND ART

Conventionally, as an example of a battery pack having a battery cell, for example, the battery pack described in PTL 1 is known. The battery pack (battery cooling device) described in PTL 1 includes a plurality of battery cells, a casing that accommodates the battery cells, a circulation path through which a fluid that exchanges heat with (cools) the battery cells in the casing flows, and a blower for circulating the fluid in the circulation path.

The circulation path includes a collecting path in which the flows of fluid that have exchanged heat with the battery cells are collected to flow in the same direction toward the blower. For example, the collecting path is formed as a collecting duct which communicates with the lower sides of the battery paths formed between adjacent battery cells and connects to the inflow path of the blower. In PTL 1, effective heat exchange (cooling) of battery cells is achieved by ensuring flow velocity by gathering the flows of fluid that have exchanged heat with the battery cells with such a collecting path.

CITATION LIST

Patent Literature

[PTL 1] JP 2015-46321 A

SUMMARY OF THE INVENTION

Technical Problem

The battery cells in a battery pack are important parts for supplying electric power to an electric device or charging by a charging device. Measures should be taken to protect the battery cells from impact in case of, for example, a situation where the battery pack is mounted on a vehicle and there is an impact such as a collision. However, although the above-described PTL 1 has good heat exchange performance, there is no consideration for protecting the battery cells from impact.

The present invention has been made in view of the above problem, and an object thereof is to provide a battery pack having good heat exchange performance for the batteries and capable of protecting the batteries against impact.

Solution to Problem

The present invention employs the following technical means to attain the above object.

One mode disclosed herein is a battery pack including a plurality of batteries, a housing accommodating the batteries therein, a circulation path formed in the housing and through which a fluid for heat exchange flows around the batteries, and a blower for causing the fluid to flow through the circulation path. The circulation path includes a bottom wall side path formed between lower faces of the batteries and a bottom wall which is the bottom side of the housing, the bottom wall is provided with a plurality of beams arranged to be parallel for reinforcing the housing, the batteries being arranged on the beams, the bottom wall side path is formed as a space surrounded by the lower faces of the batteries, the bottom wall, and the beams, and a width of the bottom wall side path formed between adjacent beams is set so as to be larger than a width of one beam. The beams are hollow members formed separately from the bottom wall, and a plate thickness of the beams is set to be larger than a plate thickness of the bottom wall.

According to this invention, since the beams are provided on the bottom wall of the housing, the beams serve as reinforcing members that improve the strength of the housing. Since the batteries are arranged on the beams, even if an impact is applied from the outside of the housing, the impact falls on the beams, and the batteries can be protected from impact.

Further, the bottom wall side paths forming a part of the circulation path is formed utilizing the reinforcing beams. Since the width of the bottom wall side paths formed between adjacent beams is set so as to be larger than the width of one beam, the bottom wall side paths have a low flow resistance to the fluid. Thus, they can be paths that effectively allow flow of the whole fluid, and it is possible to effectively exchange heat via the fluid.

Accordingly, it is possible to provide a battery pack having good heat exchange performance for the batteries and capable of protecting the batteries against impact.

It is to be noted that the reference symbols in parentheses in the claims are merely attached to indicate the corresponding example configurations of the embodiments to be described later in order to facilitate understanding of the disclosure, and they are not intended to limit the content of the invention.

BRIEF DESCRIPTION OF THE DRAWINGS

FIG. 5 is an exploded perspective view showing internal fins.

FIG. 6 is a perspective view showing external fins.

DESCRIPTION OF THE EMBODIMENTS

Figure 1:
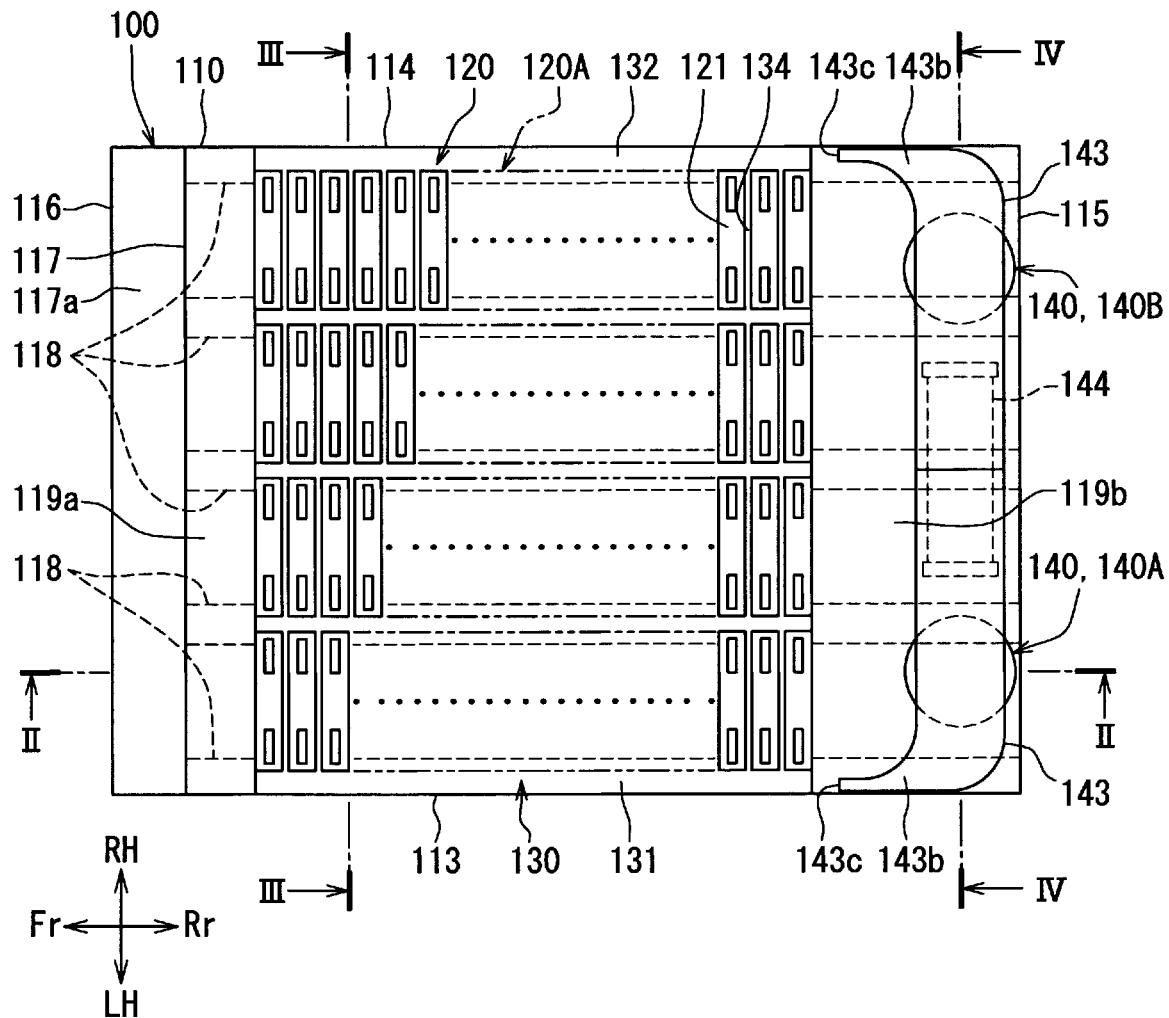
FIG. 1 is a plan view showing the configuration of a battery pack according to a first embodiment.

Embodiments for implementing the present invention will be described with reference to the drawings. Components of an embodiment corresponding to matters that have been already described with a preceding embodiment may be denoted by the same reference symbols, and redundant explanation may be omitted. When only a part of the configuration of an embodiment is described, the other embodiments described previously can be applied for the other part of the configuration. Not only those combinations of parts that are clearly indicated to be combinable specifically in relation to the embodiments, but also combinations of parts of embodiments that are not clearly indicated may be implemented if there is no obstruction in the combination.

First Embodiment

A battery pack 100 of a first embodiment which is an example of the present invention will be described with reference to FIGS. 1 to 7. For example, the battery pack 100 may be used in a hybrid vehicle which uses a motor driven by electric power charged in a battery and an internal combustion engine as its driving power sources, or an electric vehicle which uses a motor as its driving power source. The plurality of battery cells 121 included in the battery pack 100 are, for example, nickel hydrogen secondary batteries, lithium ion secondary batteries, or organic radical batteries.

The battery pack 100 is installed in a pack accommodation space such as a trunk of the vehicle or a trunk back area provided below the trunk. For example, a spare tire, tools, and the like may also be stored in this pack accommodation space. The battery pack 100 is installed in the pack accommodation space with the bottom wall 112 and the bottom wall side path 135 at the bottom.

The battery pack 100 may also be installed below the front seats or the rear sheets provided in the vehicle. In such case, the battery pack 100 is installed below the front seats, the rear seats, or the like with the bottom wall 112 and the bottom wall side path 135 at the bottom. Further, the space in which the battery pack 100 is installed below the rear seats may communicate with the trunk back area below the trunk. Further, the installation space can also be configured to communicate with the outside of the vehicle.

The battery pack 100 includes a case 110 forming a sealed internal space isolated from the outside, an assembled battery 120 (laminated cells 120A) composed of a plurality of battery cells 121 connected energizably, a circulation path 130 formed in the case 110 and through which a heat exchange fluid flows, and a blower 140 for circulating the fluid in the circulation path 130.

In the battery pack 100, internal fins 150 (151, 152) are provided inside the case 110, and external fins 160 (161, 162) are provided outside the case 110 (see FIGS. 5 and 6). Further, an external duct 170 having a blower 172 is provided outside the external fins 160 (see FIG. 7).

In the present embodiment, in FIG. 1, Fr denotes the front side of the vehicle, Rr denotes the rear side of the vehicle, RH denotes the right side of the vehicle, and LH denotes the left side of the vehicle. When indicating directions in the battery pack 100, the Fr-Rr direction of is referred to as the front-rear direction, and the RH-LH direction is referred to as the left-right direction. Further, the direction in which gravity acts will be referred to as the vertical direction.

The case 110 is a housing that houses the assembled battery 120 and blowers 140 (140A, 140B). The case 110 takes the form of a box including a plurality of walls surrounding the internal space and is formed of a molded product of an aluminum plate or an iron plate. For example, the case 110 is a cuboid that is flat in the vertical direction and has six faces, namely, a top wall 111, a bottom wall 112, a first side wall 113, a second side wall 114, a third side wall 115, and a fourth side wall 116. In addition, the case 110 includes a partition wall 117 for partitioning the interior space, and beams 118 for reinforcement at the bottom wall 112.

The top wall 111 is a wall forming the upper surface of the case 110, and is a rectangular wall having long sides in the front-rear direction. The bottom wall 112 is a wall forming the lower surface of the case 110, and has the same shape as the top wall 111.

The first and second side walls 113, 114 are walls forming the left and right surfaces of the case 110, and are elongated rectangular walls having long sides in the front-rear direction. The first and second side walls 113, 114 are in such a positional relationship that they face each other. The third and fourth side walls 115, 116 are walls forming the front and rear surfaces of the case 110, and are elongated rectangular walls having long sides in the left-right direction. The third and fourth side walls 115, 116 are in such a positional relationship that they face each other. In addition, the third and fourth side walls 115, 116 are walls orthogonal to the first and second side walls 113, 114.

Instead of the case with the above-described walls 111 to 116, the case 110 may be formed by assembling a plurality of case parts so that a box-shaped space is created therein. Further, on the surface of one or more of the walls of the case 110, a plurality of protrusions or recesses may be formed in order to increase the heat radiation area.

In the battery pack 100, the direction along the long sides of the first and second side walls 113, 114 corresponds to the front-rear direction, and the direction along the long sides of the third and fourth side walls 115, 116 corresponds to the left-right direction.

The partition wall 117 is provided near the fourth side wall 116 inside the case 110 and parallel to the fourth side wall 116, and it is a wall connecting the first and second side walls 113, 114. The partition wall 117 extends from the upper surface of the bottom wall 112 (the surface that faces the inside of the case 110) to an intermediate position in the vertical direction of the case 110. A space 117a is formed between the partition wall 117 and the fourth side wall 116. For example, a battery management unit is accommodated in the space 117a.

The battery management unit is configured to be able to communicate with various electronic control devices mounted in the vehicle. The battery management unit is a device that manages at least the amount of electricity stored in the battery cells 121, and is an example of a battery control unit that performs control related to the battery cells 121. The battery management unit may also be a device that monitors current, voltage, temperature, and the like related to the battery cells 121, and manages an abnormal state, electric leakage, and the like of the battery cells 121.

Further, a signal related to the current value detected by a current sensor is input to the battery management unit. As with a vehicle ECU, the battery management unit includes an input circuit, a microcomputer, an output circuit, and the like. Battery information is constantly accumulated as data in the memory means of the microcomputer The accumulated battery information data includes, for example, the battery voltage, charging current, discharging current, battery temperature, and the like in the battery pack 100.

The battery management unit also functions as a control device for controlling the operation of the blowers 140A and 140B, the blower 172, and a PTC heater 144. Temperature information detected by a temperature detector for detecting the temperature of the battery cell 121 is input to the battery management unit. The temperature detector is provided for each battery cell 121 or one or more certain battery cells 121. The temperature detector can be constituted by a temperature detection line for outputting a signal to the battery management unit, a temperature sensor, and the like.

When the conditions for executing battery cooling or battery heating are satisfied according to the battery temperature detected by the temperature detector, the battery management unit controls the operation of each of the blowers 140A, 140B, the blower 172, and the PTC heater 144.

Figure 2:
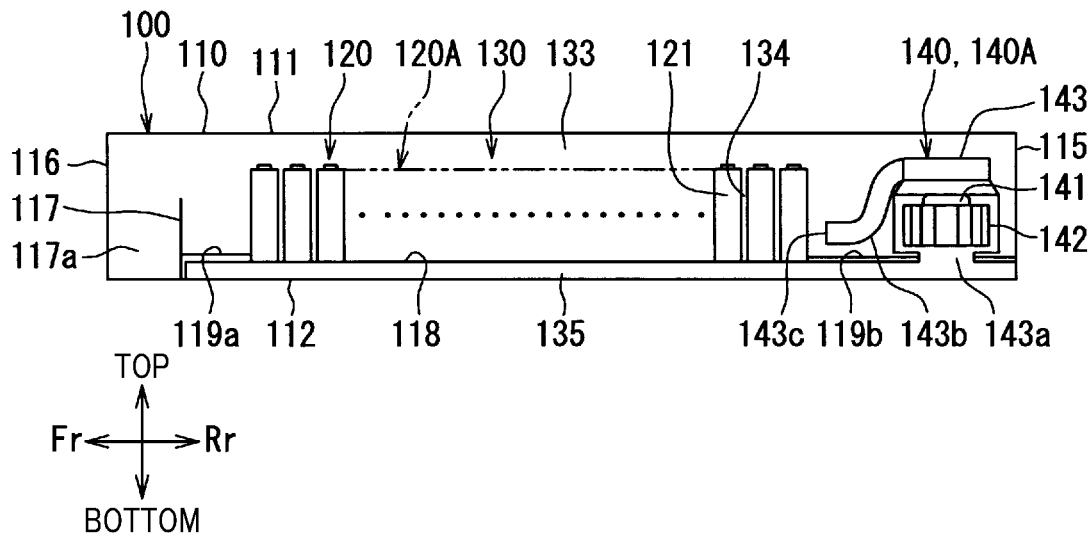
FIG. 2 is a cross-sectional view taken along the part II-II in FIG. 1.
Figure 3:
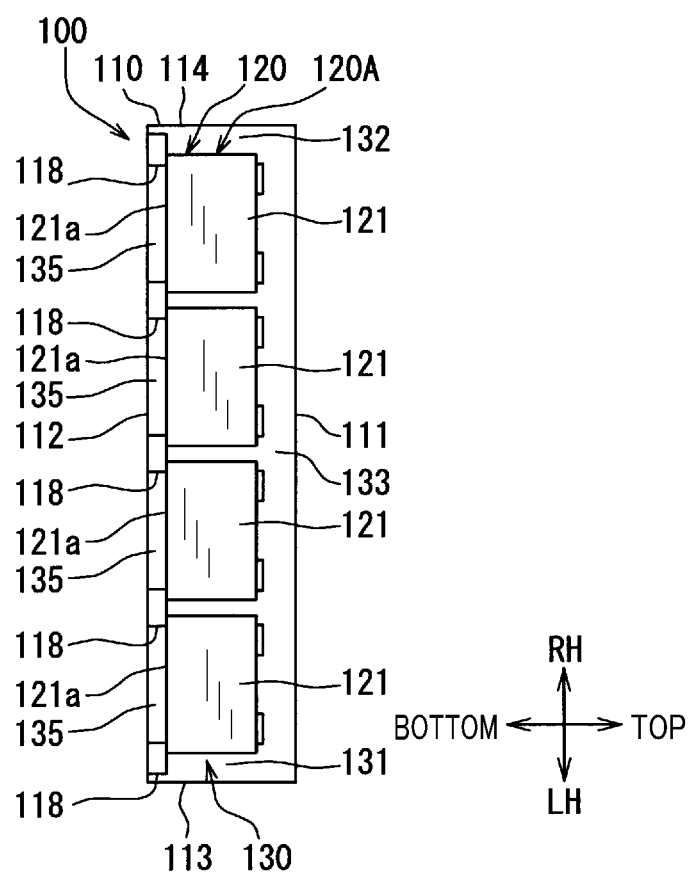
FIG. 3 is a cross-sectional view taken along the part in FIG. 1.

As shown in FIGS. 1 to 3, the beams 118 are reinforcing members for improving the strength of the case 110, and they are arranged in parallel with the upper surface of the bottom wall 112 (the inner surface of the case 110). In the present embodiment, the number of beams 118 is five. The beams 118 have an elongated rod shape, and are arranged on the bottom wall 112 so that their longitudinal direction is in the front-rear direction of the case 110 and at equal intervals in the left-right direction.

The beams 118 are formed separately from the case 110, and may be, for example, hollow square bars with a quadrangular cross section. More specifically, the beams 118 have a U-shaped (or a rectangular bracket shaped) cross section, and the opening side the U-shape is fixed to the bottom wall 112. The beams 118 are made of, for example, an aluminum material, an iron material, or the like.

Among the five beams 118, two beams 118 extend along (are in contact with) the first and second side walls 113, 114, respectively. In addition, the remaining three beams 118 are arranged between the two beams 118. The intervals between the five beams 118 are equal intervals. The pitch (distance between centerlines) between the beams 118 is set to be about the same as the dimension of the battery cell 121 in the left-right direction. The dimension between two adjacent beams 118 is set to be larger than the width of one beam 118. The width of a beam 118 is the dimension in the direction in which the beams 118 are arranged. Further, the plate thickness of the beam 118 is set to be thicker than the plate thickness of the bottom wall 112.

One end of the beam 118 in the longitudinal direction is in contact with the partition wall 117 and the other end of the beam 118 in the longitudinal direction is in contact with the third side wall 115. The length of the beams 118 is set so as to be longer than the length of the battery cells 121 as a whole in the direction along the beams 118. In other words, the longitudinal dimension of the beams 118 is set to be longer than the stacking direction dimension of the cell lamination 120A formed by the battery cells 121.

Between the partition wall 117 and the battery cells 121 (assembled battery 120), a plate-shaped closing wall 119*a* connecting the first side wall 113 and the second side wall 114 is provided over the upper surfaces of the beams 118. The upper side of the spaces between adjacent beams 118 is closed by the closing wall 119*a*.

Similarly, between the third side wall 115 and the battery cells 121 (assembled battery 120), a plate-shaped closing wall 119*b* connecting the first side wall 113 and the second side wall 114 is provided over the upper surfaces of the beams 118. The upper side of the spaces between adjacent beams 118 is closed by the closing wall 119*b*.

The assembled battery 120 includes a plurality of laminated cells 120A each formed of laminated battery cells 121. In this embodiment, for example, one cell lamination 120A includes twenty battery cells 121, and four of such laminated cells 120A are arranged to form an assembled battery 120 (see FIG. 1).

The battery cell 121 is a cuboid that is flat in the front-rear direction, and has a positive terminal and a negative terminal which protrude outside from an outer case. The battery cell 121 corresponds to the battery of the present invention.

The cell lamination 120A includes laminated battery cells 121 housed in the battery case. That is, the battery cells 121 are stacked so that their faces orthogonal to the flat direction face each other. The battery case is a case covering each battery cell 121 but leaving the upper surface side and the lower surface side of each battery cell 121 open. The cell lamination 120A corresponds to the lamination of the present invention.

In the cell laminate 120A, the terminals with different polarities of adjacent battery cells 121 are electrically connected by a conductive member such as a bus bar. Connection of the bus bar with the electrode terminals is performed by, for example, screw fastening, welding, or the like. Therefore, the terminals disposed at both ends of each battery cell 121 electrically connected by a bus bar or the like are configured to receive electric power from the outside or discharge electric power to another electric device.

In the cell lamination 120A, the battery cells 121 are laminated such that there is a certain gap between adjacent battery cells. This gap is formed by a spacer member or the like provided between the battery cells 121. For example, in the battery case, the spacer member may be formed by providing a partition wall between adjacent battery cells 121 and providing, for example, protrusions and recesses on the partition wall.

The plurality of laminated cells 120A (battery cells 121) are fixed (arranged) on the upper surfaces of the beams 118. Specifically, the lower ends of a cell lamination 120A (battery cells 121) in the direction (left-right direction) in which the beams 118 are arranged is mounted (arranged or fixed) on two beams 118, respectively.

That is, as shown in FIGS. 1 and 3, among the four laminated cells 120A, the first cell lamination 120A is placed on the first and second beams 118 from the side of the first side wall 113. The second cell lamination 120A is placed on the second and third beams 118 from the side of the first side wall 113. The third cell lamination 120A is placed on the third and fourth beams 118 from the side of the first side wall 113. The fourth cell lamination 120A is placed on the fourth and fifth beams 118 from the side of the first side wall 113.

The circulation path 130 is a path formed in the case 110 to circulate the heat exchange fluid around each battery cell 121. It mainly includes a first side wall side path 131, a second side wall side path 132, a top wall side path 133, a battery path 134, a bottom wall side path 135, and a series of flow paths connecting the blowers 140A and 140B.

The first side wall side path 131 extends perpendicularly to both the top wall 111 and the bottom wall 112 and extends parallel to the first side wall 113, and further, it is formed between the battery cells 121 (the assembled battery 120) and the first side wall 113.

The second side wall side path 132 extends perpendicularly to both the top wall 111 and the bottom wall 112 and extends parallel to the second side wall 114, and further, it is formed between the battery cells 121 (the assembled battery 120) and the second side wall 114.

The top wall side path 133 is a path formed between the top wall 111 and the battery cells 121 (assembled battery 120) and extending parallel to the top wall 111.

The first side wall side path 131 and the top wall side path 133 are connected at the boundary between the top wall 111 and the first side wall 113. In addition, the second side wall side path 132 and the top wall side path 133 are connected at the boundary between the top wall 111 and the second side wall 114.

The battery path 134 is a path formed by the gap between adjacent battery cells 121 in each cell lamination 120A.

The bottom wall side path 135 is a path formed as the space surrounded by the bottom wall 112, the lower surfaces 121a of the battery cells 121, and the beams 118. In addition, the bottom wall side path 135 includes the space surrounded by the bottom wall 112, the closing wall 119a, and the beams 118, and also the space surrounded by the bottom wall 112, the closing wall 119b, and the beams 118. The bottom wall side path 135 is a path formed between adjacent beams 118 below the battery cells 121. In the present embodiment, based on the five beams 118, four paths are formed.

Of the four bottom wall side paths 135, the second path from the side of the first side wall 113 communicates with the first path via a communicating part (not shown) in the vicinity of the blower 140A. The third path from the side of the first side wall 113 communicates with the fourth path via a communicating part (not shown) in the vicinity of the blower 140B.

The upper side of the battery path 134 is connected to the top wall side path 133 and the lower side of the battery path 134 is connected to the bottom wall side path 135.

The blower 140 is accommodated in the case 110 and is fluid driving means for forcibly flowing (circulating) a heat exchange fluid through the circulation path 130. In the present embodiment, the blower 140 includes two blowers, i.e., the first blower 140A and the second blower 140B placed side by side. Hereinafter, the two blowers 140A and 140B may be generically referred to as a blower 140. The fluid circulated in the circulation path 130 may be, for example, air, any of various gases, water, a coolant, etc.

Figure 4:
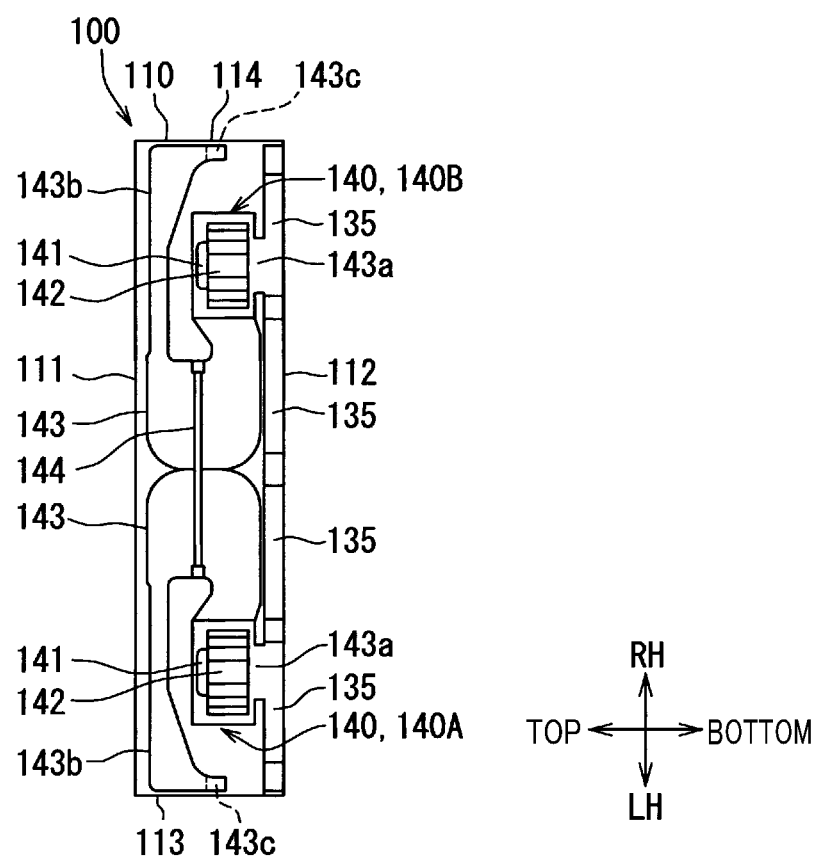
FIG. 4 is a cross-sectional view taken along the part IV-IV in FIG. 1.

As shown in FIGS. 1, 2, and 4, the first blower 140A is a blower that circulates fluid in the part of the circulation path 130 corresponding to the area of the two laminated cells 120A closer to the first side wall 113. The second blower 140B is a blower that circulates fluid in the part of the circulation path 130 corresponding to the area of the two laminated cells 120A closer to the second side wall 114. The first blower 140A and the second blower 140B are provided in the case 110 between the third side wall 115 and the laminated cells 120A (battery cells 121), such that they are symmetrical with respect to the center line extending in the front-rear direction of the case 110.

The blowers 140A, 140B each has a motor 141, a sirocco fan 142, and a fan casing 143.

The motor 141 is an electric device that rotationally drives the sirocco fan 142, and is provided above the sirocco fan 142.

The sirocco fan 142 is a centrifugal fan that sucks fluid in the direction of its rotation axis and blows the fluid out in centrifugal directions. The sirocco fan 142 is placed so that its rotation axis extends in the vertical direction.

The fan casing 143 is formed so as to cover the sirocco fan 142, and serves as a wind guide member for setting the directions in which the fluid is sucked in and blown out by the sirocco fan 142. The fan casing 143 has a suction port 143a which is opened at the lower side of the sirocco fan 142, a outflow duct 143b which guides the flow of the blown fluid, and a outflow port 143c which is opened at the leading end of the outflow duct 143b.

The suction port 143a of each blower 140A, 140B is positioned so as to be connected to an area of the bottom wall side path 135 near the third side wall 115.

The suction port 143a of the blower 140A is connected with, among the four bottom wall side paths 135, the first and second paths from the side of the first side wall 113. The suction port 143a of the blower 140B is connected with, among the four bottom wall side paths 135, the third and fourth paths from the side of the first side wall 113.

The outflow duct 143b of each blower 140A, 140B once extends from a side surface of the sirocco fan 142 towards the center of the case 110. The outflow duct 143b then makes a U-turn and extends towards the first and second side wall side path 131 or 132.

The outflow port 143c of the blower 140A is positioned so as to be connected to the first side wall side path 131. Specifically, the outflow port 143c is located closer to the bottom in the vertical direction in the first side wall side path 131, near the battery cell 121 of the laminated battery cells 121 that is close to the third side wall 115, and so that it faces the fourth side wall 116 side.

The outflow port 143c of the blower 140B is positioned so as to be connected to the second side wall side path 132. Specifically, the outflow port 143c is located closer to the bottom in the vertical direction in the second side wall side path 132, near the battery cell 121 of the laminated battery cells 121 that is close to the third side wall 115, and so that it faces the fourth side wall 116 side.

At an intermediate position of the fan casing 143, a heating device for heating the fluid to a certain temperature is provided. The heating device may be, for example, a PTC heater 144 having a self-temperature control function.

As shown in FIG. 5, the internal fin 150 is a fin for promoting heat exchange provided inside the case 110, and it includes a first internal fin 151 and a second internal fin 152. The internal fins 151 and 152 are made of an aluminum material or an iron material having good thermal conductivity.

The first internal fin 151 is provided on the side of the first side wall 113 and the side of the second side wall 114 so as to be symmetrical with respect to the center line extending in the front-rear direction of the case 110. The second internal fin 152 is provided on the top wall 111 at two positions, i.e., on the side of the first side wall 113 and the side of the second side wall 114 so as to be symmetrical with respect to the center line extending in the front-rear direction of the case 110.

Here, for example, a straight fin which makes it possible to set the flow resistance to the fluid relatively small is adopted for each of the internal fins 151, 152. A straight fin includes a number of thin-plate shaped fin parts protruding perpendicularly from a thin plate-shaped substrate part, which are arranged so that fluid paths are formed between adjacent fin parts.

The internal fins 151 and 152 are not limited to the above-mentioned straight fin but may also be another corrugated fin (with or without louvers), an offset fin, or the like.

The substrate part of the first internal fin 151 forms an elongated right triangular shape A, B, C, and the corner A-B-C is substantially a right angle. The length of the long side A-B extending in the front-rear direction is set to be generally equal to the length of the cell lamination 120A in the lamination direction. The length of the short side B-C extending in the vertical direction is set to be somewhat smaller than the vertical dimension of the first and second side walls 113, 114. The substrate part is positioned so that its position in the front-rear direction corresponds to the position of the cell lamination 120A. The short side B-C is located on the side of the fourth side wall 116, the apex angle B-A-C opposed to the short side B-C is located on the side of the third side wall 115, and the long side A-B is located so that it extends along the upper edge of the first and second side walls 113, 114. The substrate part is attached to the inner surface of the first or second side wall 113, 114. Thus, the hypotenuse C-A of the substrate part is a side inclined downward from the third side wall 115 side toward the fourth side wall 116 side.

The fin parts of the first internal fin 151 protrudes perpendicularly from the substrate part toward the battery cells 121 side, and protruded tips extend to the vicinity of the side surfaces of the battery cells 121 so that more fluid flows inside the fin parts. The plates of the fin part are designed to be inclined toward the fourth side wall 116 from the lower side to the upper side with respect to the vertical direction. Further, the length of the fluid path provided by the fin parts increases as it gets closer to the fourth side wall 116 from the third side wall 115 side.

On the other hand, the substrate part of the second internal fin 152 forms an elongated triangular shape D, E, F. The length of the long side D-E extending in the front-rear direction is set to be generally equal to the length of the long side A-B of the substrate part of the first internal fin 151. The substrate part of the second internal fin 152 is positioned so that its position in the front-rear direction corresponds to the position of the first internal fin 151. The short side E-F is located on the side of the third side wall 115, the apex angle E-D-F opposed to the short side E-F is located on the side of the fourth side wall 116, and the long side D-E is located so that it extends along the edge of the top wall 111 in the front-rear direction. The substrate part of the second internal fin 152 is attached to the inner surface of the top wall 111 so that it is located adjacent to the fin parts of the first internal fin 151.

The fin parts of the second internal fin 152 protrudes perpendicularly from the substrate part toward the battery cells 121 side, and protruded tips extend to the vicinity of the upper surfaces of the battery cells 121 so that more fluid flows inside the fin parts. The plates of the fin parts are designed to be inclined toward the fourth side wall 116 as it gets closer to the center of the case 110 with respect to the left-right direction. The length of the fluid path provided by the fin parts decreases as it gets closer to the fourth side wall 116 from the third side wall 115 side. The fluid path formed by the fin parts of the second internal fin 152 is continuously connected to the fluid path formed by the fin parts of the first internal fin 151.

As shown in FIG. 6, the external fin 160 is a fin for promoting heat exchange provided outside the case 110, and it includes a first external fin 161 and a second external fin 162. The external fins 161 and 162 are made of a material having good thermal conductivity, for example, an aluminum material or an iron material.

The first external fin 161 is provided on the side of the first side wall 113 and the side of the second side wall 114 so as to be symmetrical with respect to the center line extending in the front-rear direction of the case 110. The second external fin 162 is provided on the top wall 111 at two positions, i.e., on the side of the first side wall 113 and the side of the second side wall 114 so as to be symmetrical with respect to the center line extending in the front-rear direction of the case 110.

Here, for example, a corrugated fin which makes it possible to set the thermal conductivity with respect to the fluid relatively large is adopted for each of the external fins 161, 162. A corrugated fin has a corrugated shape as a whole, and many louvers are formed on the corrugated opposing surfaces, and fluid paths are formed between corrugated opposing surfaces and between louvers.

The external fins 161 and 162 may also be a straight fin like the above-described internal fins 151, 152, a corrugated fin that does not have louvers, an offset fin, or the like.

The first external fin 161 is provided in a set of more than one fin units (here, two fin units). They are formed at areas of the first and second side walls 113 and 114 corresponding to the first internal fin 151, in such a manner that the direction in which the wave continues is directed in the front-rear direction, and so as to be somewhat offset toward the fourth side wall 116.

The second external fin 162 is provided in a set of more than one fin units (here, two fin units). They are formed at areas of the top wall 111 that are close to the first and second side walls 113 and 114 and corresponding to the second internal fin 152, in such a manner that the direction in which the wave continues is directed in the front-rear direction, and so as to be somewhat offset toward the third side wall 115 as compared with the first external fin 161.

Figure 7:
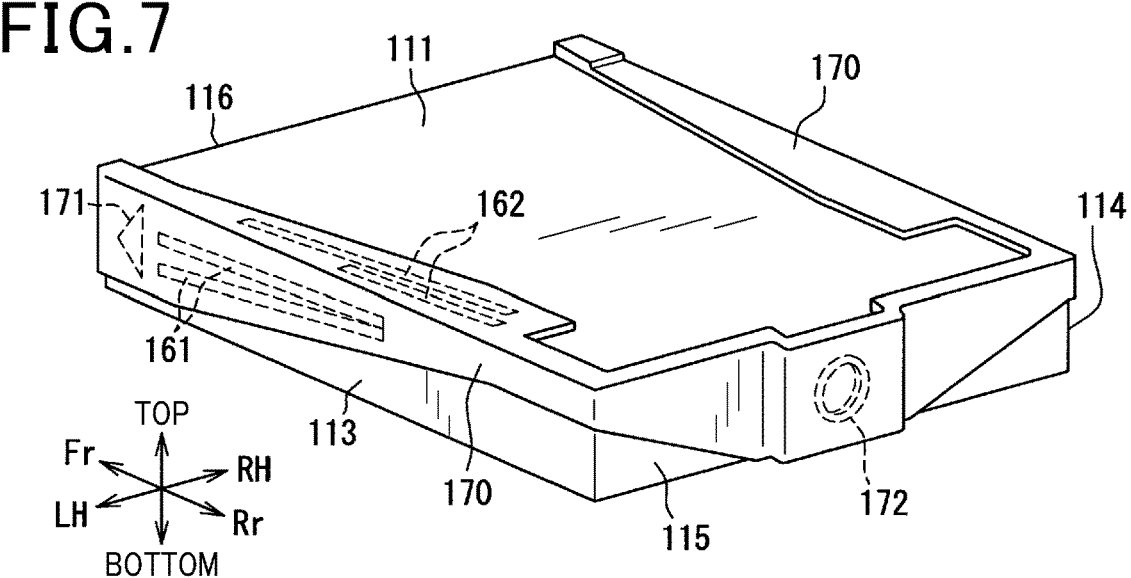
FIG. 7 is a perspective view showing an external duct.

As shown in FIG. 7 (FIG. 11), the external duct 170 is a duct for circulating the cooling fluid along the outer surface of the case 110. The cooling fluid may be, for example, cooled air in the vehicle.

The external duct 170 has a flat cross-sectional shape and is provided over the outer surface of the case 110, more specifically, the areas of the first and second side walls 113 and 114, the areas of the top wall 111 that are close to the first and second side walls 113 and 114, and the area of the third side wall 115. Further, it is formed so as to enclose (cover) the external fins 161 and 162. The inside of the external duct 170 is a flow path which mainly communicates in the order of the areas of the first and second side walls 113, 114, the areas of the top wall 111 that are close to the first and second side walls 113, 114, and the area of the third side wall 115.

Suction parts for sucking cooled air are provided at the two ends (the first and second side walls 113, 114 sides) of the external duct 170 on the fourth side wall 116 side. A wind direction device 171 for splitting the sucked cooled air to a flow heading to the lower side of the first external fin 161 and a flow heading to the center side of the case 110 of the second external fin 162 is provided on the downstream side immediately after the suction part.

A blower 172 is provided at the center of the third side wall 115 side of the external duct 170, and the upper part and the lower part of the blower 172 serve as outflow parts from which the cooled air is blown out. The blower 172 may be, for example, a turbofan.

The operation of the battery pack 100 as described above will be described with reference to FIGS. 8 to 11.

Each battery cell 121 produces heat upon outputting where current is taken out and upon inputting where the battery cell 121 is charged. In addition, the battery cells 121 are affected by the temperature of the outside of the case 110 according to the season. The battery management unit constantly monitors the temperature of the battery cells 121 in the battery pack 100 with a temperature detector, and controls the operation of the blowers 140A and 140B, the blower 172, and the PTC heater 144 based on the temperature of the battery cells 121.

The battery management unit operates the sirocco fan 142 by applying voltage to the blowers 140A, 140B according to the temperature of the battery cells 121. Depending on the temperature of the battery cells 121, the PTC heater 144 may be operated together with the blowers 140A and 140B, or the blower 172 may be operated together with the blowers 140A and 140B.

Figure 8:
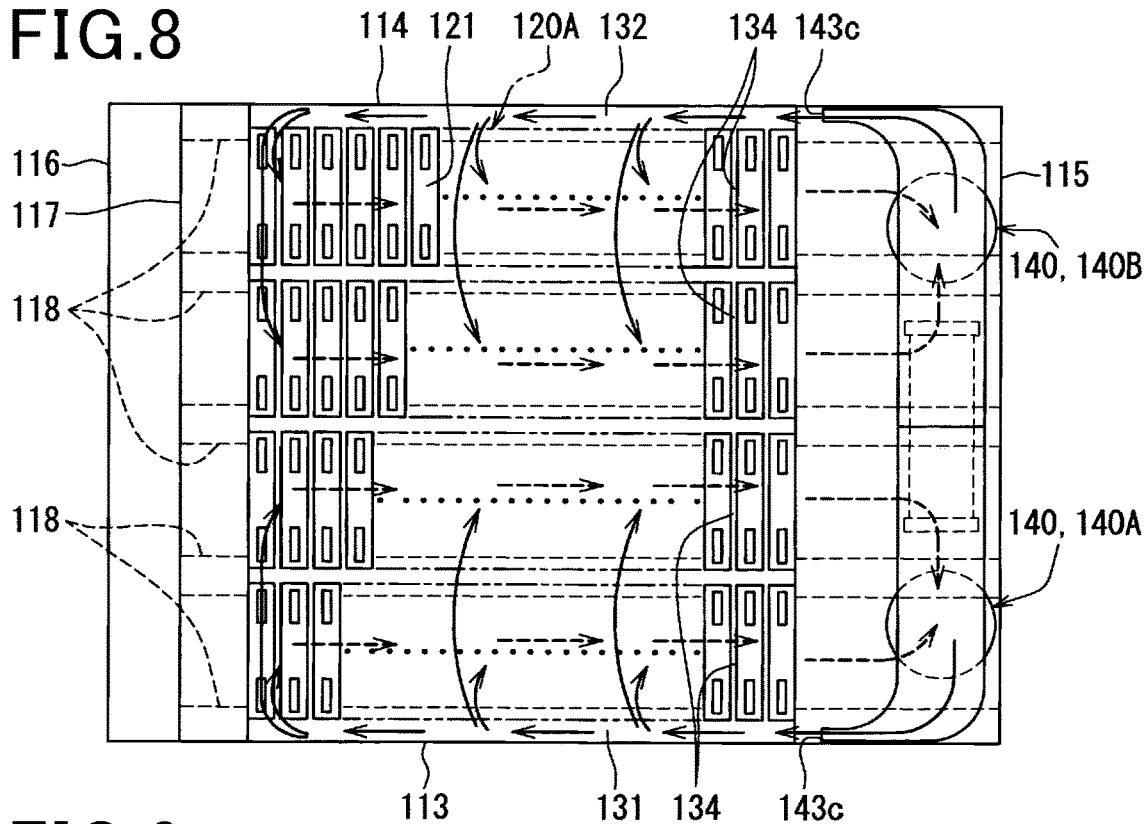
FIG. 8 is a plan view showing the flow of fluid in the case.
Figure 9:
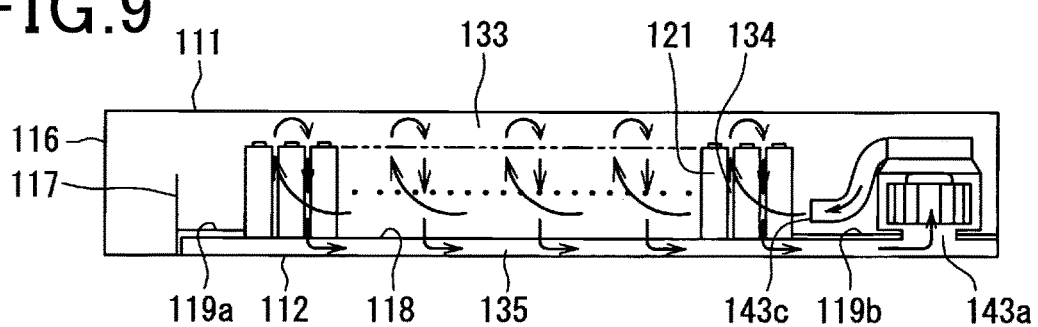
FIG. 9 is a side view showing the flow of fluid in the case.
Figure 10:
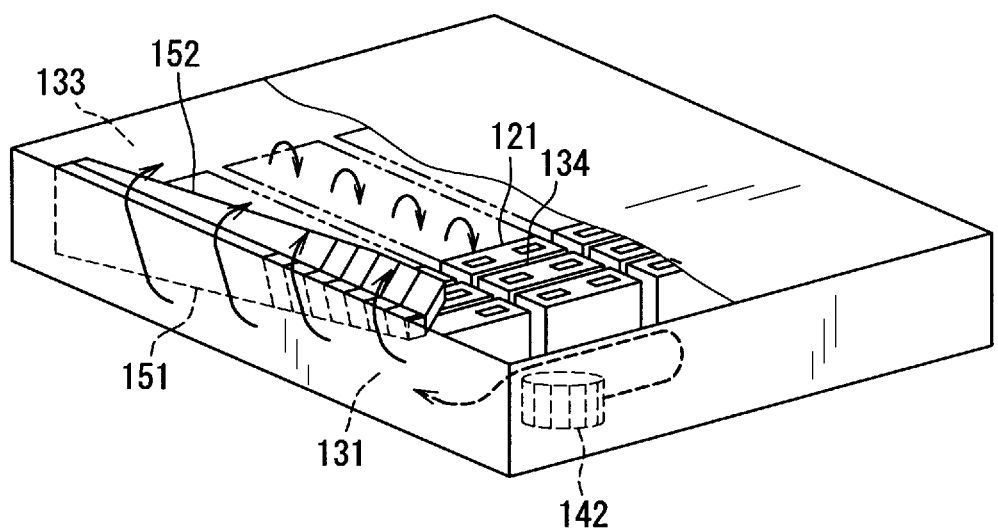
FIG. 10 is a perspective view showing the flow of fluid created by the internal fins in the case.

As described above, when only the blowers 140A and 140B are operated, the fluid inside the case 110 circulates through the circulation path 130 as shown in FIGS. 8 to 10.

That is, the fluid sucked in from the suction port 143a of each blower 140A, 140B and blown out from the outflow port 143c via the outflow duct 143b flows into the first side wall side path 131 and the second side wall side path 132, respectively.

The fluid that have flown into the first and second side wall side paths 131, 132 flows smoothly from the lower side (the bottom wall 112 side) to the upper side (the top wall 111 side) along the inclined fin parts of the first internal fin 151). The first and second side wall side paths 131 and 132 are long paths with flat cross sections and extend along the long edges of the first and second side wall side paths 131 and 132. The inlet cross-sectional area of when the fluid flows is smaller than the other parts, i.e., the top-wall side path 133, the battery path 134, and the bottom wall side path 135, so that some flow velocity of the fluid is obtained, and dynamic pressure is dominant here. Therefore, in the first and second side wall side paths 131, 132, the heat of the fluid with a flow velocity is effectively transmitted to the first internal fin 151, and further, the heat is transmitted to the outside via the first and second side walls 113, 114.

Next, the fluid smoothly flows to the fin parts of the second internal fin 152 continuously connected to the first internal fin 151, and flows along the fin parts into the top wall side path 133. The inlet cross-sectional area of when flowing into the top wall side is significantly larger than the inlet cross-sectional area of when flowing into the first and second side wall side paths 131 and 132. The flow velocity of the fluid is small, and static pressure is dominant here. Therefore, the fluid that has flown into the top wall side path 133 from the sides of the first and second side wall side paths 131, 132 spreads evenly in the top wall side path 133.

As shown in FIG. 8, the fluid that has flown into the top wall side path 133 from the first side wall side path 131 spreads mainly into the area of the two laminated cells 120A that are close to the first side wall 113. In addition, the fluid that has flown into the top wall side path 133 from the second side wall side path 132 spreads mainly into the area of the two laminated cells 120A that are close to the second side wall 114. The heat of the fluid that has flown into the top wall side path 133 is transmitted from the second internal fin 152 to the top wall 111 or is directly transmitted to the top wall 111, and is then released to the outside.

Next, the fluid that has flown into the top wall side path 133 passes through the battery paths 134 formed between the battery cells 121 and reaches the bottom wall side path 135. The first and second side wall side paths 131 and 132, and the top wall side path 133 become positive pressure spaces due to the blowing of the blowers 140A and 140B. Further, the bottom wall side path 135 becomes a negative pressure space due to the suction by the blowers 140A, 140B, and the pressure difference between them causes the fluid to continuously move from the top wall side path 133 side to the bottom wall side path 135 side. When the fluid passes through the battery path 134, the heat of each battery cell 121 is transferred to the fluid.

Next, the fluid that has flown into the bottom wall side path 135 moves along the longitudinal direction of the beams 118 and reaches the suction port 143a of each blower 140A, 140B. The heat of the fluid that has flown into the bottom wall side path 135 is transferred to the bottom wall 112 and is then released to the outside.

As described above, as a result of the circulation of the fluid through the circulation path 130 in the case 110, the heat of the fluid, that is, the heat of the battery cells 121 is released to the outside mainly from the top wall 111 and the bottom wall 112 having large areas. At this point, heat exchange is promoted by the internal fins 151, 152. Thus, each battery cell 121 is adjusted to an appropriate temperature.

Further, when the temperature of the battery cells 121 is low, the PTC heater 144 is operated in addition to the blowers 140A and 140B. Then, the fluid flowing through the outflow duct 143b is heated by the PTC heater 144. As the heated fluid circulates through the circulation path 130 in the case 110 as described above, on the contrary, the temperature of each battery cell 121 is raised by the heated fluid to a temperature at which it can be properly operate, and the performance deterioration at low temperature can be corrected.

Further, when the temperature of the battery cells 121 is high, the blower 172 in the external duct 170 is operated in addition to the blowers 140A and 140B. In this case, the cooled air in the vehicle is sucked into the external duct 170 from the suction port of the external duct 170.

Figure 11:
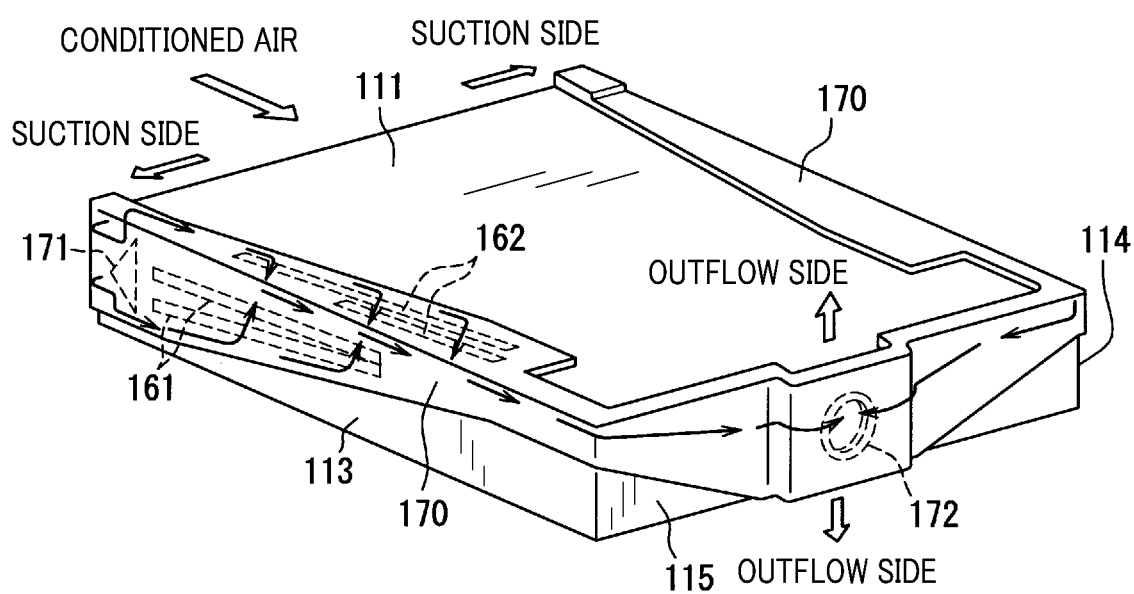
FIG. 11 is a perspective view showing the flow of cooling fluid in the external duct.

As shown in FIG. 11, the cooled air sucked from the suction port is divided by the wind direction device 171 into a flow toward the lower side of the first external fin 161 and a flow toward the center side of the case 110 of the second external fin 162. Then, the flows pass across the external fins 161, 162, respectively, and after merging together, the flow is blown out from the outflow parts provided at the upper and lower parts of the blower 172.

At this time, the heat of the fluid in the case 110 is transmitted to the cooled air via the internal fins 151, 152, the first and second side walls 113, 114, the top wall 111, and the external fins 161, 162 to be released to the outside. Thus, the heat exchange of the heat of the fluid in the case 110 is further promoted by the external fins 161, 162 in addition to the internal fins 151, 152. Each battery cell 121 is forcibly cooled to an appropriate temperature in a short time.

As described above, according to the battery pack 100 of the present embodiment, the battery cells 121, the circulation path 130, and the blowers 140A and 140B are provided in the case 110. Further, thanks to the PTC heater 144 and the internal fins 151, 152, it is possible to appropriately heat or control the temperature of each battery cell 121 according to the temperature of the battery cells 121 without leaking the operation noise of the blowers 140A, 140B to the interior of the vehicle. Furthermore, thanks to the external fins 161, 162 and the external duct 170 (blower 172), it is also possible to perform forcible cooling when the temperature is high.

In the present embodiment, since the beams 118 are provided on the bottom wall 112 of the case 110, the beams 118 serve as reinforcing members that improve the strength of the case 110. Since the battery cells 121 are arranged on the beams 118, even if an impact is applied from the outside of the case 110, the impact falls on the beams 118, and the battery cells 121 can be protected from impact.

The bottom wall side paths 135 forming a part of the circulation path 130 is formed utilizing the reinforcing beams 118. Since the width of the bottom wall side paths 135 formed between adjacent beams 118 is set so as to be larger than the width of one beam 118, the bottom wall side paths 135 have a low flow resistance to the fluid. Thus, they can be paths that effectively flow the whole fluid, and it is possible to effectively exchange heat via the fluid.

Thus, it is possible to provide a battery pack 100 having good heat exchange performance for the battery cells 121 and capable of protecting the batteries against impact.

In addition, since the beams 118 are utilized as members for forming parts of the bottom wall side paths 135, the size of the battery pack 100 itself is reduced as compared with when beams are provided to merely reinforce the case 110.

In addition, in the present embodiment, the beams 118 are hollow members formed separately from the bottom wall 112, and the plate thickness of the beams 118 is larger than the plate thickness of the bottom wall 112. Thus, the reinforcing effect provided by the beam 118 can be increased. At the same time, since the plate thickness of the bottom wall 112 is smaller than the plate thickness of the beams 118, the thermal resistance at the bottom wall 112 can be reduced, and the heat exchange efficiency of the fluid that has exchanged heat with the battery cells 121 with the bottom wall 112 can be increased.

The length of the beams 118 is set so as to be longer than the length of the battery cells 121 as a whole (assembled battery 120) in the direction along the beams 118. Thus, when an impact is applied to the battery pack 100, the beams' 118 large area absorbs the impact, and therefore it is possible to more effectively protect the battery cells 121.

In addition, the battery cells 121 form laminated cells 120A which are laminated in the longitudinal direction of the beams 118, and the laminated cells 120A are arranged similarly to the beams 118. The lower ends of each battery cell 121 in the direction in which the beams 118 are arranged are mounted on two beams 118, respectively. This makes it possible to stably install the battery cells 121 on the beams 118, and also, the bottom wall side paths 135 can be configured such that the heat exchange area of the lower face 121a of each battery cell 121 is maximally utilized.

Further, gaps are provided between the battery cells 121 in the lamination direction of the laminated cells 120A. Each gap serves as a battery path 134 forming a part of the circulation path 130, and the battery paths 134 communicate with the bottom wall side paths 135. Thus, is possible to form a circulation path 130 in which the battery paths 134 and the bottom wall side paths 135 are easily connected without a connecting member such as a duct.

Other Embodiments

In the above-described embodiments, preferred embodiments of the present invention have been described. However, the present invention is not limited to the above-described embodiments in any way, and various modifications can be made without departing from the spirit of the present invention. The structures of the above-described embodiments are merely examples, and the scope of the present invention is not limited to the scope of their descriptions. The scope of the present invention is indicated by the descriptions in the claims, and includes equivalents of the descriptions in the claims and all changes within the scope.

Although the beams 118 used in the first embodiment are hollow, they may also be solid. In addition, although the beams 118 are members separate from the bottom wall 112, protrusions and recesses may be formed over the bottom wall 112 to form a profile corresponding to the beams 118 integrally with the bottom wall 112. When the beams are integrally formed with the bottom wall 112, the plate thickness of the beams and the plate thickness of the bottom wall 112 will be the same.

In addition, the length of the beams 118 may be at least about the same as the dimension of the laminated cells 120A in the lamination direction.

Although it has been described that the ends of each battery cell 121 in the direction in which the beams 118 are arranged are placed on the beams 118, if the dimension between adjacent beams 118 is set to be greater than the width of one beam 118, an intermediate part of the battery cell 121 may be placed on a beam 118.

Further, although it has been described that the fluid in the case 110 flows through the circulation path 130 in the order of the blowers 140A, 140B, the first and second side wall side paths 131, 132, the top wall side path 133, the battery paths 134, and the bottom wall side path 135, the order may be reversed.

The battery pack 100 of the first embodiment is configured such that a plurality of blowers 140A and 140B circulate the fluid through the circulation path 130, but it is also possible to use, for example, a single blower, or three or more blowers to circulate the fluid through the circulation path 130.

Besides the sirocco fan described in the first embodiment, an axial flow fan, a turbo fan, or the like can be used as the fans built in the blowers 140A and 140B provided in the case 110.

Further, the PTC heater 144 need not to be provided inside the fan casing 143, and instead it may be provided outside the fan casing 143 and inside the case 110.

The essential configuration of the present invention is the case 110, the assembled battery 120, the circulation path 130, and the blower 140. The internal fin 150, the external fin 160, and the outer duct 170 may be components that are set as required.

When the internal fin 150 and the external fin 160 are set, the may be fins that are formed integrally on the first and second side walls 113, 114 and the top wall 111.

In the above-described embodiments, the case (housing) 110 forms a hexahedron, a cuboid, but the shape of the housing of the invention is not limited to this shape. For example, the case 110 may be a polyhedron having more than six faces, or at least one face may be a face including a curved face. Further, the case 110 may be configured in a dome form with a top wall 111 having a curved face, or the longitudinal sectional shape of the case 110 may be a trapezoidal shape. In the case 110, the top wall 111 is a wall in a positional relationship opposed to the bottom wall 112, and its shape may include a flat face or a curved face. In the case 110, the first to fourth side walls 113 to 116 may either be walls extending from the bottom wall 112 in a direction intersecting with the bottom wall 112, or walls extending from the top wall 111 in a direction intersecting with the top wall 111. The boundaries between the top wall 111 and the first to fourth side walls 113 to 116 of the case 110 may form corners or curved faces. The boundaries between the bottom wall 112 and the first to fourth side walls 113 to 116 of the case 110 may form corners or curved faces.

In the above-described embodiments, the number of laminated cells 120A in the battery pack 100 is four, but their number is not limited to this. That is, the battery pack 100 may include, in the case 110, only one cell lamination 120A, a plurality of laminated cells 120A arranged in one direction, or a plurality of laminated cells 120A arranged in more than one intersecting directions.

REFERENCE SIGNS LIST

100 . . . Battery pack
110 . . . Case (housing)
112 . . . Bottom wall
118 . . . Beam
120A . . . Cell lamination (lamination)
121 . . . Battery cell (battery)
121a . . . Lower face
130 . . . Circulation path
134 . . . Battery path
135 . . . Bottom wall side path
140 . . . Blower

The invention claimed is:

1. A battery pack comprising:
a plurality of batteries;
a housing accommodating the batteries therein;
a circulation path formed in the housing and through which a fluid for heat exchange flows around the batteries;
first and second blowers that are disposed in the housing and that are for causing the fluid to flow through the circulation path; and
an internal fin that is (i) for promoting heat exchange, (ii) located inside the housing so as to be in the circulation path, and (iii) formed integrally with one of a first side wall, a second side wall, and a top wall of the housing, wherein:
the circulation path includes four bottom wall side paths formed between lower faces of the batteries and a bottom wall which is the bottom side of the housing,
the bottom wall is provided with a plurality of beams that are arranged to be parallel for reinforcing the housing and between which the four bottom wall side paths are formed, the batteries being arranged on the beams,
each bottom wall side path is formed as a space surrounded by the lower faces of ones of the batteries, the bottom wall, and adjacent ones of the beams,
a width of each bottom wall side path formed between the corresponding adjacent beams is larger than a width of one of the beams,
the beams are hollow members formed separately from the bottom wall,
a plate thickness of the beams is larger than a plate thickness of the bottom wall,
the first blower is connected with first and second paths among the four bottom wall side paths, and
the second blower is connected with third and fourth paths among the four bottom wall side paths.

2. The battery pack according to claim 1, wherein, a length of the beams is larger than a length of the batteries as a whole in a direction along the beams.

3. The battery pack according to claim 1, wherein, the batteries form laminations each laminated in the longitudinal direction of the beams, the laminations being arranged in the same manner as an arrangement of the beams, and
both lower ends of each battery in a direction in which the beams are arranged are placed on respective ones of the beams.

4. The battery pack according to claim 3, wherein, gaps are provided between the batteries in a lamination direction of the laminations, each gap serving as a battery path forming a part of the circulation path, and
the battery paths communicate with the bottom wall side paths.

5. The battery pack according to claim 1, wherein the first and second blowers are entirely disposed above the bottom wall side paths.

6. The battery pack according to claim 1, wherein bottommost surfaces of the first and second blowers are located above the plurality of beams.

7. The battery pack according to claim 1, further comprising an external fin that is (i) for promoting heat exchange, (ii) located outside the housing, and (iii) formed integrally with one of the first side wall, the second side wall, and the top wall of the housing.

8. The battery pack according to claim 7, further comprising an external duct for circulating cooling fluid along an outer surface of the housing, the external duct being located outside the external fin so as to cover the external fin.

9. The battery pack according to claim 8, further comprising:
a plurality of the internal fins that comprises:
a first internal fin on the first side wall;
a second internal fin on the second side wall;
a third internal fin on a side of the top wall that is adjacent to the first side wall; and
a fourth internal fin on a side of the top wall that is adjacent to the second side wall; and
a plurality of the external fins that comprises:
a first external fin on the first side wall;
a second external fin on the second side wall;
a third external fin on the side of the top wall that is adjacent to the first side wall; and
a fourth internal fin on the side of the top wall that is adjacent to the second side wall, wherein
the external duct covers the first, second, third, and fourth external fins.

10. The battery pack according to claim 9, wherein the external duct comprises a blower for circulating the cooling fluid.

11. The battery pack according to claim 8, wherein the internal fin is a straight fin comprising a number of thin-plate shaped fin parts protruding perpendicularly from a thin plate-shaped substrate part.

12. The battery pack according to claim 11, wherein the substrate part forms an elongated right triangular shape.

13. The battery pack according to claim 12, wherein the external fin comprises a set of fin units formed at areas of the first side wall, the second side wall, or the top wall correspond to the internal fin.

14. The battery pack according to claim 1, wherein each beam of the plurality of beams extends from a third side wall of the housing to a fourth side wall of the housing that faces the third side wall.

15. The battery pack according to claim 14, wherein:
the first and second paths among the four bottom wall side paths communicate with each other via a communicating part in the vicinity of the first blower; and
the third and fourth paths among the four bottom wall side paths communicate with each other via another communicating part in the vicinity of the second blower.

* * * * *